United States Patent
Appleton et al.

(10) Patent No.: US 6,769,321 B1
(45) Date of Patent: Aug. 3, 2004

(54) CONDUIT TRAVERSING VEHICLE

(75) Inventors: Ernest Appleton, Durham (GB); Neil William Stutchbury, Tyne & Wear (GB)

(73) Assignee: University of Durham, Durham (GB)

( * ) Notice: Subject to any disclaimer, the term of this patent is extended or adjusted under 35 U.S.C. 154(b) by 0 days.

(21) Appl. No.: 10/070,563

(22) PCT Filed: Sep. 21, 2000

(86) PCT No.: PCT/GB00/03614

§ 371 (c)(1),
(2), (4) Date: Nov. 4, 2002

(87) PCT Pub. No.: WO01/23213

PCT Pub. Date: Apr. 5, 2001

(30) Foreign Application Priority Data

Sep. 29, 1999 (GB) ............................................. 9923000

(51) Int. Cl.[7] .......................... F16L 55/38; F16L 55/34; F16L 55/18; G01M 19/00; B08B 9/55
(52) U.S. Cl. .................................... 73/866.5; 104/138.2
(58) Field of Search ............................ 73/865.8–865.9, 73/866.5; 104/138.2; 15/104.061

(56) References Cited

U.S. PATENT DOCUMENTS

| 3,107,496 | A | * | 10/1963 | Ver Nooy | .......... | 15/104.061 X |
| 3,725,968 | A | * | 4/1973 | Knapp et al. | .......... | 15/104.061 |
| 4,007,784 | A | | 2/1977 | Watson et al. | .................. | 166/70 |
| 4,242,771 | A | * | 1/1981 | Knapp | ................... | 15/104.061 |
| 4,602,659 | A | * | 7/1986 | Parkyn, Sr. | ................... | 138/98 |
| 6,427,602 | B1 | * | 8/2002 | Hovis et al. | .......... | 104/138.2 X |
| 6,431,079 | B1 | * | 8/2002 | Appleton et al. | ........ | 104/138.2 |
| 2003/0044237 | A1 | * | 3/2003 | Carter et al. | ............. | 405/184.1 |
| 2004/0045474 | A1 | * | 3/2004 | Simpson | .................. | 104/138.2 |

FOREIGN PATENT DOCUMENTS

| DE | 27 56 561 A1 | 6/1979 | .............. F23J/3/02 |
| DE | 3312222 A1 | * 10/1984 | ................. 305/157 |
| GB | 2 167 829 A | 6/1986 | .......... F16L/55/10 |
| WO | WO/ 86/01751 | 3/1986 | ............. B08B/9/04 |
| WO | WO 98/06927 | 2/1998 | .......... E21B/23/14 |
| WO | WO 02/42601 A1 | 5/2002 | .......... E21B/23/14 |
| WO | WO 00/73619 A1 | 12/2002 | .......... E21B/37/04 |

* cited by examiner

*Primary Examiner*—Thomas P. Noland
(74) *Attorney, Agent, or Firm*—Beyer Weaver & Thomas LLP

(57) ABSTRACT

A vehicle (1) for travelling along a conduit (2) having fluid flowing therein is described. The vehicle comprises a forward set of resilient bristles (12) and a rear set of bristles (18) which are adapted to move towards and away from the forward bristles (12). The forward bristles (12) engage the surface of the conduit (2) and apply a greater gripping force when they are moving towards the mar bristles (18) than when they are moving away from the rear bristles (18). Similarly, the rear bristles (18) apply a larger gripping force to the surface of the conduit (2) when they are moving away from the forward bristles (12) than when they are moving towards the forward bristles (12). A drive means (4) has a shaft (9) which is rotated by fluid flow, and a reverse traverse screw (14) is connected to the shaft such that rotation of the shaft (9) causes a thread follower (16) to move along the reverse traverse screw (14) first in one direction, and then the other, to move the forward (12) and rear (18) bristles towards and then away from each other. This causes the vehicle (1) to move along the conduit (2).

42 Claims, 4 Drawing Sheets

CONDUIT TRAVERSING VEHICLE

BACKGROUND

The present invention relates to vehicles for travelling along conduits having fluid flowing therein, and relates particularly, but not exclusively, to vehicles for travelling along liquid transportation pipelines having liquid flowing therein.

In many industries, it is important to be able to gain access to pipelines for maintenance and/or inspection. Pipeline inspection vehicles are known which engage the internal surface of a pipeline and propel themselves along the pipeline, deriving power from a remote power source connected to the vehicle by means of an umbilical cable.

Such known pipeline inspection vehicles are generally only used for pipelines in which no fluid is flowing and if the distance to be travelled is relatively short (up to 1 km). If fluid is present and flowing it is possible to use a pig which uses the pressure of the fluid acting over sealing cups to propel the vehicle forward, that is, with the flow of the fluid. However, most conventional pigs are only uni-directional and, as such, must be recovered via a pig receiving trap at the opposite end of the pipeline. If a pig receiving trap is not fitted, which is often the case, then it is desirable to have a bi-directional vehicle. Such long range bi-directional vehicles do not presently exist. As a result of this drawback, it is usually necessary to suspend operation of the pipeline for the duration of the vehicle operation. In the case of industries such as the oil or petroleum industry, ceasing operation of a pipeline for the duration of a maintenance and/or inspection operation can involve unacceptably high cost.

Preferred embodiments of the present invention seek to overcome the above disadvantages of the prior art.

SUMMARY

According to the present invention, there is provided a vehicle for travelling along a conduit having fluid flowing therein, the vehicle comprising:
 (a) propulsion means including first surface engaging means for engaging a surface of the conduit to apply a gripping force thereto, and at least one second surface engaging means located forwardly in use of said first surface engaging means and adapted to engage a surface of the conduit to apply a gripping force thereto and adapted to move towards and away from said first surface engaging means, wherein the or each said second surface engaging means in use applies a greater gripping force when it is moving towards said first surface engaging means than when it is moving away from said first surface engaging means, and said first surface engaging means applies a larger gripping force when it is moving away from the or each said second surface engaging means than when it is moving towards the or each said second surface engaging means, to cause said propulsion means to move along the conduit;
 (b) drive means having a shaft portion adapted to be rotated as a result of fluid flow relative to the drive means; and
 (c) connector means for causing the or each said second surface engaging means to move away from said first surface engaging means as a result of rotation of said shaft portion.

The present invention is based on the surprising discovery that sufficient energy can be generated from the fluid flow relative to the vehicle to propel the vehicle along the conduit in the opposite direction to the direction of fluid flow. This provides the advantage that the vehicle can under certain circumstances access previously inaccessible conduits, and can crawl "outwards" from a launching point against the flow of fluid and swim back an almost infinite distance to its launching point with the flow of fluid, and transport of fluid along the conduit does not need to be suspended while the vehicle is in operation. In the case of the oil and petroleum industries, this avoids the unacceptably high cost of shutting a pipeline down.

Preferably, said first and/or second surface engaging means comprises a respective plurality of resilient bristles.

By providing bristles such that the external diameter of the vehicle at the bristles is greater than the internal diameter of the conduit, the bristles can engage the internal surface of the conduit oriented in the opposite direction to the direction of travel of the vehicle. This enables the frictional force between the bristles and the conduit to be greater in one direction than in the other. This provides the further advantage that no further energy input is required to cause the bristles to apply a gripping force to the surface of the conduit, and enables the propulsion means to be constructed in a simple and cost effective manner.

Alternatively, the first and/or second surface engaging means may comprise a respective electrically and/or magnetically operated gripping means.

In a preferred embodiment, said first and/or second surface engaging means is mounted to a respective vehicle body portion and adjacent pairs of said body portions are adapted to move relative to each other.

In an alternative embodiment, said first and/or second surface engaging means is mounted to a single vehicle body portion.

The drive means may comprise at least one turbine.

At least one said turbine may be a multi stage turbine.

This provides the advantage of increasing the efficiency with which rotational energy of the shaft portion is derived from fluid flow relative to the drive means.

The drive means preferably further comprises at least one stator for altering direction of fluid flow to increase efficiency of transfer of energy from the fluid to at least one said turbine.

For example, the or each said stator may alter the direction of fluid flow to maximise the extent to which fluid contacts blades of at least one said turbine substantially perpendicularly to the face of the blades to maximise efficiency of energy transfer.

In a preferred embodiment, said connector means comprises a first part having at least one first cam groove and a second part having at least one cam projection adapted to engage at least one said first cam groove such that rotation of said shaft portion in a first sense causes at least one said cam projection to move along a said first cam groove to cause at least one said second surface engaging means to move away from said first surface engaging means.

This feature is based on the highly surprising discovery that contrary to expectations, by providing a first part having at least one first cam groove and a second part having at least one cam projection, sufficient energy can be derived from rotation of the shaft portion to cause at least one said second surface engaging means to move away from the first surface engaging means.

The first part may further include at least one second cam groove to cause at least one said second surface engaging means to move towards said first surface engaging means.

In a preferred embodiment, the or each said first cam groove has a smaller pitch than the or each said second cam groove.

Since movement of the or each said second surface engaging means away from said first surface engaging means requires more energy than movement towards said first surface engaging means (because movement of the first and second surface engaging means away from each other generally involves moving the second surface engaging means, drive means and connector means against the flow of fluid, whereas movement of the surface engaging means together generally only involves movement of the first surface engaging means against the flow of fluid), by providing the or each said second cam groove of larger pitch than the or each said first cam groove, this provides the advantage of enabling the or each second surface engaging means to be moved towards the first surface engaging means as rapidly as possible.

In a preferred embodiment, at least one said first cam groove is connected to at least one said second cam groove, and at least one said cam projection is adapted to transfer between said first and second cam grooves to reverse the direction of travel of the first part relative to the second part.

The vehicle may further comprise biasing means for urging at least one said second surface engaging means towards said first surface engaging means.

This provides the advantage that the propulsion means can under certain circumstances be constructed in a relatively simple manner, without the need for the connector means to cause the or each second surface engaging means to move towards said first surface engaging means.

The vehicle may further comprise at least one gearbox connected between said drive means and said connector means.

This provides the advantage of giving a mechanical advantage which enables the vehicle to travel more efficiently along the conduit.

In a preferred embodiment, the vehicle is articulated.

This provides the advantage of enabling the vehicle to negotiate bends in the conduit.

The vehicle is preferably articulated rearwardly of said drive means in use.

The vehicle preferably further comprises braking means for increasing the fluid drag of the vehicle.

This provides the advantage of enabling the vehicle to travel with the flow of fluid along the conduit when the vehicle is to be recovered from the conduit.

The braking means preferably comprises at least one sealing means for sealingly engaging the internal surface of the conduit.

The vehicle may further comprise one or more wheels for engaging the surface of the conduit.

The vehicle may further comprise conduit inspection means.

The vehicle may further comprise conduit repair means.

BRIEF DESCRIPTION OF THE DRAWINGS

As an aid to understanding the invention, a preferred embodiment thereof will now be described, by way of example only and not in any limitative sense, with reference to the accompanying drawings, in which.

DETAILED DESCRIPTION OF THE DRAWINGS

Figure 1:
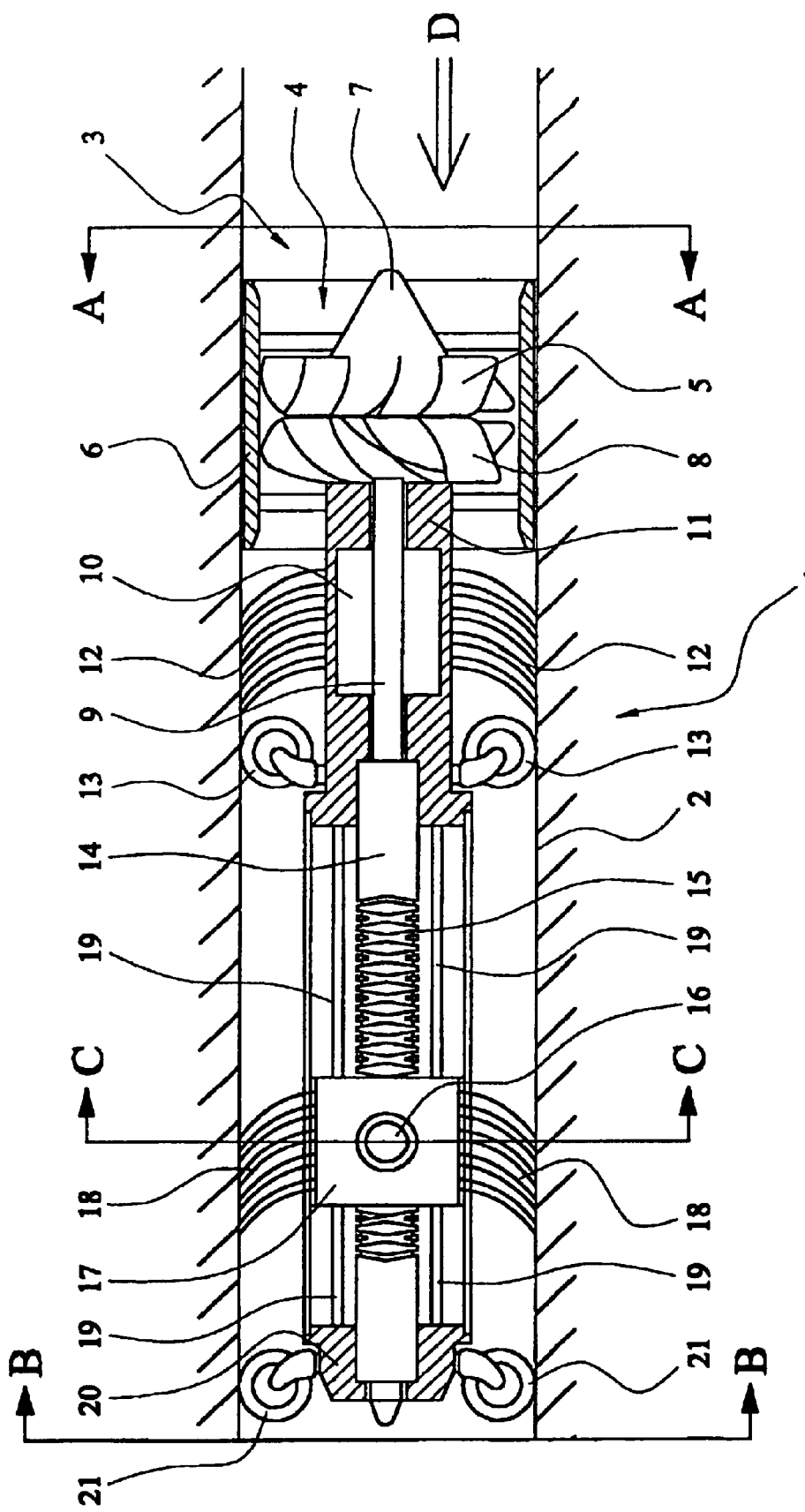
FIG. 1 is a partial longitudinal cross-sectional view of a conduit traversing vehicle embodying the present invention.

Referring in detail to FIG. 1, a vehicle 1 for travelling along a conduit 2 such as a pipeline having a fluid 3 such as oil flowing therein in the direction of arrow D comprises a drive means 4 including a turbine 5 located within a housing 6. The turbine 5 has a stator 7 (the function of which will be described below) and a rotor 8 connected to a shaft 9 via a gearbox 10 such that movement of fluid 3 in the direction of arrow D causes rotation of the rotor 8 which in turn causes rotation of the shaft 9.

A first body member 11 is connected to the drive means 4 such that the shaft 9 can rotate relative to the body member 11. The body member 11 carries a first set of resilient bristles 12 having an external diameter greater than the internal diameter of the conduit 2 so that the bristles 12 engage the internal surface of the pipeline 2 and point in the direction of arrow D. The body member 11 also carries a set of wheels 13 for engaging the internal surface of the conduit 2 and centralising the vehicle 1 within the conduit. A reverse traverse screw 14 is connected to the shaft 9 and has two sets of cam grooves 15 in its surface which mate with a thread follower 16 supported by a nut 17 carrying a second set of resilient bristles 18 of similar construction to the first set of bristles 12. The nut 17 is mounted to a guide 19 which is in turn connected to a housing 20 carrying the end of reverse traverse screw 14 remote from the drive means 4. Rotation of the shaft 9 causes rotation of reverse traverse screw 14 which, through engagement of the thread follower 16 in cam grooves 15, causes axial movement of the nut 17 along guides 19 relative to the body member 11. The housing 20 contains a bearing, and is provided with a set of wheels 21 for engaging the internal surface of the pipeline 2.

Figure 2:
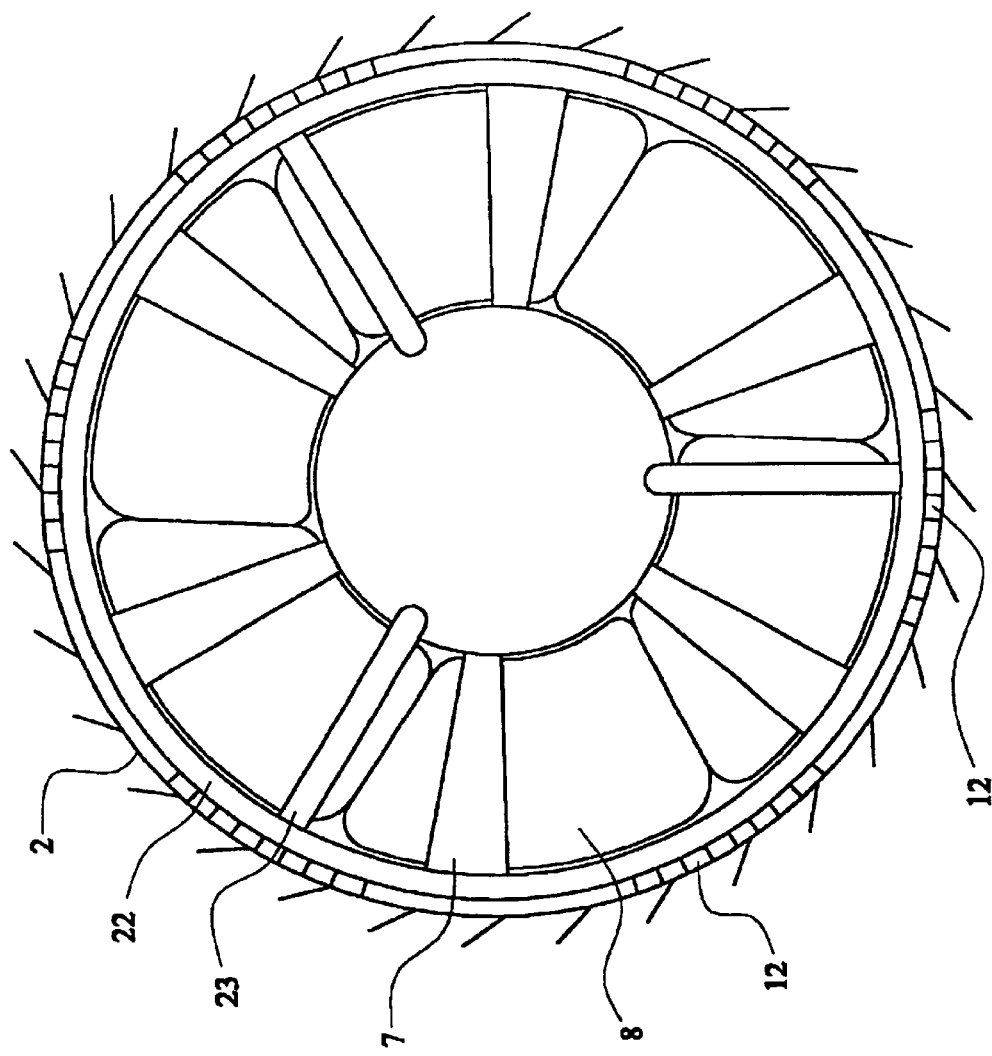
FIG. 2 is a view along the line A—A in FIG. 1.

Referring in detail to FIG. 2, the turbine housing 6 comprises a cowling 22 supporting the stator 7 on struts 23, the cowling 22 being sized to have a small clearance from the internal wall of the conduit 2. The rotor 8 is arranged behind the stator 7 and the surfaces of the rotor and stator are oriented such that the stator 7 causes the direction of fluid flowing therethrough to change so that the fluid contacts the blades of the rotor 8 in a direction generally perpendicular to the faces of the blades to ensure maximum efficiency of energy transfer.

Figure 3:
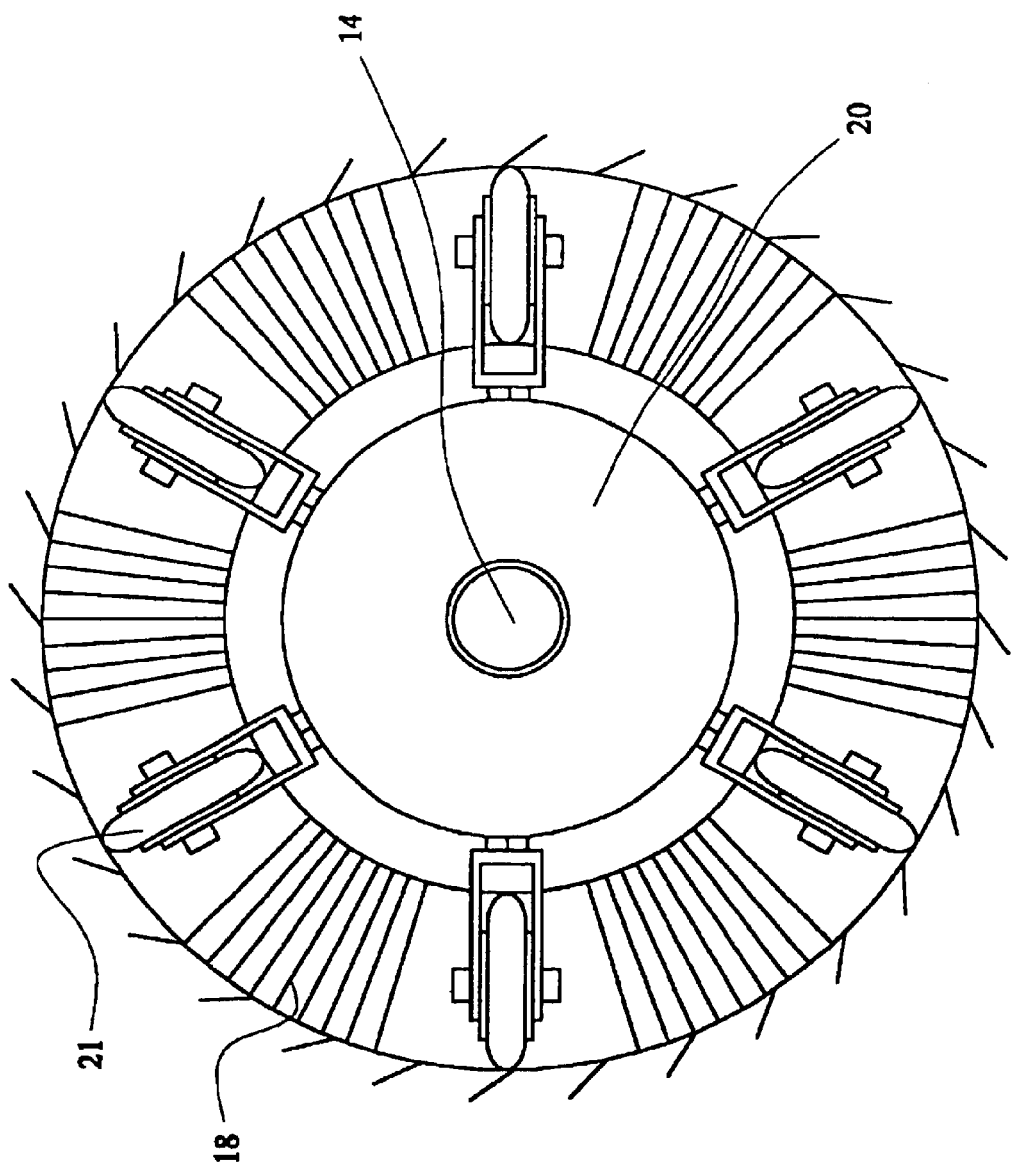
FIG. 3 is a view along the line B—B in FIG. 1.

Referring to FIG. 3, the reverse traverse screw 14 having cam grooves 15 is received within housing 20 supporting wheels 21 which in turn engage the internal surface of the conduit 2. The wheels 21 and rear bristles 18 are alternately spaced circumferentially around the axis of the vehicle.

Figure 4:
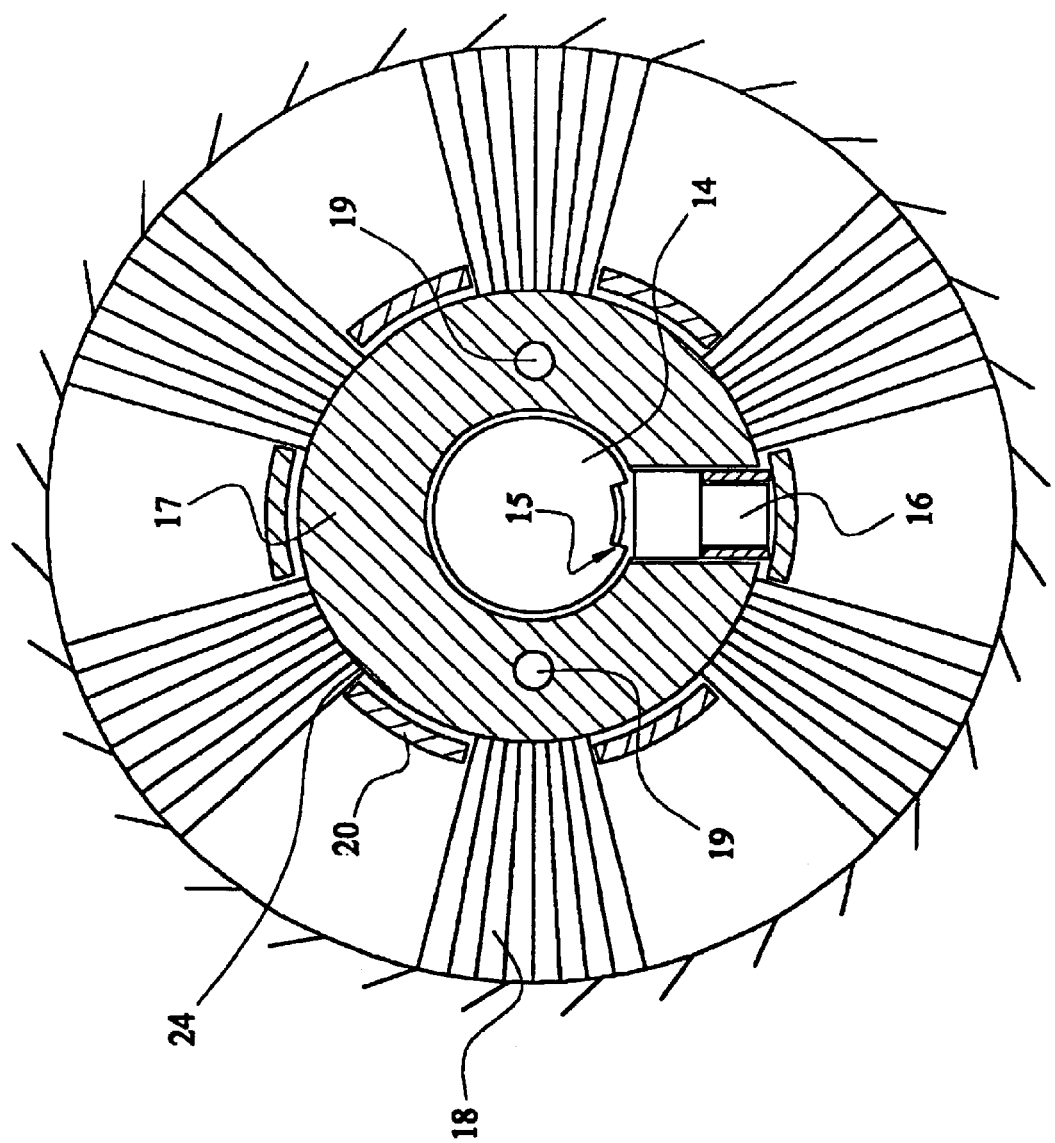
FIG. 4 is a view along the line C—C in FIG. 1.

FIG. 4 shows a cross-sectional view along the line C—C in FIG. 1. The nut 17 carries thread follower 16 which engages one of the grooves 15 on the reverse traverse screw 14, and the nut 17 is adapted to slide along guides 19 located within the housing 20. The bristles 18 project through elongate slots 24 in the housing 20.

The operation of the vehicle 1 described with reference to FIGS. 1 to 4 will now be described.

As fluid flows in the direction of arrow D shown in FIG. 1, movement of the fluid through the stator 7 causes the turbine rotor 8 to rotate, which in turn causes rotation of the shaft 9. This in turn causes rotation of the reverse traverse screw 14, as a result of which the thread follower 16 engages a first one of the cam grooves 15 and causes the nut 17 to slide longitudinally relative to the body member 11. This causes the first bristles 12 and second bristles 18 to be moved away from each other.

Because the bristles 12, 18 are oriented backwards relative to the direction of travel of the vehicle, the frictional force of the bristles 12, 18 against the wall of the pipe 2 is greater in the rearward direction than in the forward direction. Accordingly, the rear bristles 18 do not move or move very little relative to the wall of the conduit 2, whereas the forward bristles 12 and body member 11 are urged forwards.

As the nut 17 reaches the end of its travel along the cam groove 15 of the reverse traverse screw 14, the thread follower 16 is so shaped that it is forced to engage the other cam groove 15 and is caused to move in the opposition direction relative to the reverse traverse screw 14. As a result, the rear bristles 18 and front bristles 12 are moved towards each other. The forward bristles 12 have greater resistance to moving backwards than the rear bristles 18 have to moving forwards, so the forward bristles 12 and body member 11 remain stationary, or only move very little, relative to the pipe wall 2 and the rear bristles 18 are moved forwards until the nut 17 reaches the forward end of its travel along the reverse traverse screw 14. The process then repeats itself, and the vehicle 1 travels along the pipe 2.

It will be appreciated by persons skilled in the art that the above embodiment has been described by way of example only and not in any limitative sense, and that various alterations and modifications are possible without departure from the scope of the invention as defined by the appended claims, For example, more than two sets of bristles 12,18 may be used, or the bristled may be replaced by elongate elastomeric members. Alternatively, the bristles 12,18 may be replaced by electrically or magnetically operated gripping means which are urged radially outwards from the vehicle body to apply a gripping force to the internal wall of the conduit.

What is claimed is:

1. A vehicle for travelling along a conduit having fluid flowing therein, the vehicle comprising:
   (a) a propulsion apparatus including a first surface engaging device for engaging a surface of the conduit to apply a gripping force thereto, and a second surface engaging device located forwardly in use of said first surface engaging device and adapted to engage a surface of the conduit to apply a gripping force thereto and adapted to move towards and away from said first surface engaging device, wherein said second surface engaging device in use applies a greater gripping force when it is moving towards said first surface engaging device than when it is moving away from said first surface engaging device, and said first surface engaging device applies a larger gripping force when it is moving away from said second surface engaging device than when it is moving towards the or each said second surface engaging device, to cause said propulsion apparatus to move along the conduit;
   (b) a drive apparatus having a shaft portion adapted to be rotated as a result of fluid flow relative to the drive apparatus; and
   (c) a connector apparatus for causing said second surface engaging device to move away from said first surface engaging device as a result of rotation of said shaft portion.

2. A vehicle according to claim 1, wherein at least one of the first and second surface engaging devices comprises a respective plurality of resilient bristles.

3. A vehicle according to claim 1, wherein at least one of the first and second surface engaging devices comprises a gripping device that is at least one of electrically or magnetically operated.

4. A vehicle according to claim 1, wherein at least one of the first and second surface engaging devices is mounted to a respective vehicle body portion and adjacent pairs of said body portions are adapted to move relative to each other.

5. A vehicle according to claim 1, wherein at least one of the first and second surface engaging devices is mounted to a single vehicle body portion.

6. A vehicle according to claim 1, wherein said drive apparatus comprises at least one turbine.

7. A vehicle according to claim 6, wherein at least one said turbine is a multi stage turbine.

8. A vehicle according to claim 6, wherein the drive apparatus further comprises at least one stator for altering direction of fluid flow to increase efficiency of transfer of energy from the fluid to the at least one said turbine.

9. A vehicle according to claim 1, wherein said connector apparatus comprises a first part having at least one first cam groove and a second part having at least one cam projection adapted to engage at least one said first cam groove such that rotation of said shaft portion in a first sense causes at least one said cam projection to move along a said first cam groove to cause said second surface engaging device to move away from said first surface engaging device.

10. A vehicle according to claim 9, wherein the first part further includes at least one second cam groove to cause said second surface engaging device to move towards said first surface engaging device.

11. A vehicle according to claim 10, wherein the or each said first cam groove has a smaller pitch than the or each said second cam groove.

12. A vehicle according to claim 10, wherein at least one said first cam groove is connected to at least one said second cam groove, and at least one said cam projection is adapted to transfer between said first and second cam grooves to reverse the direction of travel of the first part relative to the second part.

13. A vehicle according to claim 1, further comprising a biasing device for urging said second surface engaging device towards said first surface engaging device.

14. A vehicle according to claim 1, further comprising at least one gearbox connected between said drive apparatus and said connector apparatus.

15. A vehicle according to claim 1, wherein the vehicle is articulated.

16. A vehicle according to claim 15, wherein the vehicle is articulated rearwardly of said drive apparatus in use.

17. A vehicle according to claim 1, further comprising a braking apparatus for increasing the fluid drag of the vehicle.

18. A vehicle according to claim 17, wherein the braking apparatus comprises at least one sealing device for sealingly engaging the internal surface of the conduit.

19. A vehicle according to claim 1, further comprising one or more wheels for engaging the surface of the conduit.

20. A vehicle according to claim 1, further comprising a conduit inspection apparatus.

21. A vehicle according to claim 1, further comprising conduit repair.

22. A vehicle for travelling along a conduit having fluid flowing therein, the vehicle comprising:
   (a) at least one first surface engaging member for engaging a surface of the conduit to apply a gripping force thereto, and at least one second surface engaging member located forwardly in use of the or each said first surface engaging member and adapted to engage a surface of the conduit to apply a gripping force thereto and adapted to move towards and away from the or each said first surface engaging member, wherein the or each said second surface engaging member in use applies a greater gripping force when it is moving towards the or each said first surface engaging member than when it is moving away from the or each said first surface engaging member, and the or each said first surface engaging member applies a larger gripping force when it is moving away from the or each said second surface engaging member than when it is moving towards the or each said second surface engaging member, to cause the vehicle to move along the conduit;

(b) drive apparatus having a shaft portion adapted to be rotated as a result of fluid flow relative to the drive apparatus; and (c) a connector for causing the or each said second surface engaging member to move away from the or each said first surface engaging member as a result of rotation of said shaft portion.

23. A vehicle according to claim 22, wherein at least one of the first and second surface engaging members comprises a respective plurality of resilient bristles.

24. A vehicle according to claim 22, wherein the or each first and/or second surface engaging member comprises a respective electrically and/or magnetically operated gripper.

25. A vehicle according to claim 22, wherein at least one of the first and second surface engaging members is mounted to a respective vehicle body portion and adjacent pairs of said body portions are adapted to move relative to each other.

26. A vehicle according to claim 22, wherein at least one of the first and second surface engaging members is mounted to a single vehicle body portion.

27. A vehicle according to claim 22, wherein said drive apparatus comprises at least one turbine.

28. A vehicle according to claim 27, wherein at least one said turbine is a multi stage turbine.

29. A vehicle according to claim 27, wherein the drive apparatus further comprises at least one stator for altering direction of fluid flow to increase efficiency of transfer of energy from the fluid to at least one said turbine.

30. A vehicle according to claim 22, wherein said connector comprises a first part having at least one first cam groove and a second part having at least one cam projection adapted to engage at least one said first cam groove such that rotation of said shaft portion in a first sense causes at least one said cam projection to move along a said first cam groove to cause at least one said second surface engaging member to move away from the or each said first surface engaging member.

31. A vehicle according to claim 30, wherein the first part further includes at least one second cam groove to cause at least one said second surface engaging member to move towards the or each said first surface engaging member.

32. A vehicle according to claim 31, wherein the or each said first cam groove has a smaller pitch than the or each said second cam groove.

33. A vehicle according to claim 31, wherein at least one said first cam groove is connected to at least one said second cam groove, and at least one said cam projection is adapted to transfer between said first and second cam grooves to reverse the direction of travel of the first part relative to the second part.

34. A vehicle according to claim 22, further comprising a biasing device for urging at least one said second surface engaging member towards the or each said first surface engaging member.

35. A vehicle according to claim 22, further comprising at least one gearbox connected between said drive apparatus and said connector.

36. A vehicle according to claim 22, wherein the vehicle is articulated.

37. A vehicle according to claim 36, wherein the vehicle is articulated rearwardly of said drive apparatus in use.

38. A vehicle according to claim 22, further comprising at least one brake for increasing the fluid drag of the vehicle.

39. A vehicle according to claim 38, wherein at least one said brake comprises a respective seal for sealingly engaging the internal surface of the conduit.

40. A vehicle according to claim 22, further comprising one or more wheels for engaging the surface of the conduit.

41. A vehicle according to claim 22, further comprising conduit inspection apparatus.

42. A vehicle according to claim 22, further comprising conduit repair apparatus.

* * * * *